(12) United States Patent
Yeh et al.

(10) Patent No.: US 8,873,013 B2
(45) Date of Patent: Oct. 28, 2014

(54) LIQUID CRYSTAL DISPLAY PANEL

(75) Inventors: Chao-Wei Yeh, Taoyuan County (TW); Chien-Huang Liao, Hsinchu (TW); Wen-Hao Hsu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 81 days.

(21) Appl. No.: 13/227,481

(22) Filed: Sep. 8, 2011

(65) Prior Publication Data

US 2013/0010219 A1 Jan. 10, 2013

(30) Foreign Application Priority Data

Jul. 6, 2011 (TW) .............................. 100123893 A

(51) Int. Cl.
  *G02F 1/1343* (2006.01)
  *G09G 3/36* (2006.01)
  *G02F 1/13* (2006.01)
  *G02F 1/1337* (2006.01)

(52) U.S. Cl.
  CPC .. *G02F 1/1323* (2013.01); *G02F 2001/133757* (2013.01); *G02F 1/134336* (2013.01); *G09G 3/36* (2013.01); *G02F 1/133753* (2013.01)
  USPC ............................................ 349/144; 349/33

(58) Field of Classification Search
  USPC .................................................... 349/144, 33
  See application file for complete search history.

(56) References Cited

U.S. PATENT DOCUMENTS

2008/0266471 A1* 10/2008 Hisatake ......................... 349/15

FOREIGN PATENT DOCUMENTS

TW  200917218  4/2009

\* cited by examiner

*Primary Examiner* — Richard Kim
*Assistant Examiner* — Kendrick Hsu
(74) *Attorney, Agent, or Firm* — Jianq Chyun IP Office

(57) ABSTRACT

A liquid crystal display (LCD) panel divided into a first area and a second area is provided. The first and second areas both include first sub-pixels and second sub-pixels. Each first sub-pixel provides a first main alignment vector; each second sub-pixel provides a second main alignment vector having a direction opposite to that of the first main alignment vector. The LCD panel has first sub-pixel units and second sub-pixel units arranged in arrays. Each first sub-pixel unit includes one first sub-pixel and one second sub-pixel sequentially arranged from top to bottom in a column direction. Each second sub-pixel unit includes one first sub-pixel and one second sub-pixel sequentially arranged from bottom to top in the column direction. In any one of the first area and the second area, multiple first sub-pixel units and multiple second sub-pixel units are arranged together in a same row.

28 Claims, 9 Drawing Sheets

LIQUID CRYSTAL DISPLAY PANEL

CROSS-REFERENCE TO RELATED APPLICATION

This application claims the priority benefit of Taiwan application serial no. 100123893, filed on Jul. 6, 2011. The entirety of the above-mentioned patent application is hereby incorporated by reference herein and made a part of this specification.

BACKGROUND OF THE INVENTION

1. Field of the Invention

The invention generally relates to a liquid crystal display (LCD) panel, and more particularly, to an LCD panel having a privacy protecting function.

2. Description of Related Art

A display apparatus is required to have the characteristics of wide viewing angles when displaying images, so as to comply with the requirement that a plurality of users can simultaneously watch the images displayed on the same display apparatus. Nevertheless, on certain conditions, such as writing down business information or inputting the personal account number and password into an ATM machine, the characteristics of wide viewing angles of the display apparatus easily lead to the disclosure of users' personal information. Accordingly, the display apparatus is required to have the privacy protecting design, so as to prevent others from spying on the highly confidential data.

At present, a privacy protecting design is proposed and achieved by way of the alignment configuration of a liquid crystal display (LCD) panel. In such privacy protecting technology, the LCD panel in the display apparatus serves to perform the display function. FIG. 1 is a schematic partial view illustrating a conventional LCD panel having the privacy protecting function. With reference to FIG. 1, the display panel 100 is divided into at least one first area I and at least one second area II by dotted lines d1 and d2, for instance. Both the first area I and the second area II include a plurality of first sub-pixels 102 and a plurality of second sub-pixels 104. Each of the first sub-pixels 102 provides a first main alignment vector A1, and each of the second sub-pixels 104 provides a second main alignment vector A2. Here, the alignment vectors A1 and A2 are obtained by quantifying the capacity of the sub-pixels 102 and 104 for aligning liquid crystal and are relevant to the designed alignment direction and the measure of the alignment areas. A direction of the first main alignment vector A1 is opposite to a direction of the second main alignment vector A2.

In order to protect privacy, the LCD panel 100 can enter a narrow viewing angle mode, such that the displayed images can be clearly observed only by the users at the normal viewing angle. Here, the first sub-pixels 102 in the first area I are enabled, the second sub-pixels 104 in the first area I are disabled, the first sub-pixels 102 in the second area II are disabled, and the second sub-pixels 104 in the second area II are enabled. The changes of brightness in the first area I and the second area II of the LCD panel 100 tend to be different when the LCD panel 100 is watched at different polar viewing angles and different azimuth viewing angles. Here, the polar viewing angle refers to the included angle between the observation direction of the user and the baseline when the normal viewing angle direction (defining the 0-degree polar viewing angle) serves as the baseline (i.e., the normal line of the LCD panel), and the azimuth viewing angle refers to the included angle on the horizontal surface between the observation direction of the user and a horizontal axis direction (e.g. the row direction of the pixel array of the LCD panel). By applying said design, the LCD panel 100 can perform the privacy protecting function.

However, as indicated in FIG. 1, only a portion of the first area I or a portion of the second area II in the LCD panel 100 is lighted. From the perspective of users at the normal viewing angle, dark zones DA or bright zones BA can be frequently observed at the junction (e.g., shown by the dotted line d2) of the first and second areas I and II. Hence, the images observed by the user at the normal viewing angle are not clear.

SUMMARY OF THE INVENTION

The invention is directed to an LCD panel that can simultaneously perform a privacy protecting function and achieve favorable display effects at a normal viewing angle.

In an embodiment of the invention, an LCD panel that is divided into at least one first area and at least one second area is provided. The first area and the second area both include a plurality of first sub-pixels and a plurality of second sub-pixels. Each of the first sub-pixels provides a first main alignment vector, and each of the second sub-pixels provides a second main alignment vector having a direction opposite to a direction of the first main alignment vector. When the LCD panel is in a narrow viewing angle display mode, a driving voltage applied to the first sub-pixels in the first area is substantially higher than a driving voltage applied to the second sub-pixels in the first area, and a driving voltage applied to the first sub-pixels in the second area is substantially lower than a driving voltage applied to the second sub-pixels in the second area. The LCD panel has a plurality of first sub-pixel units and a plurality of second sub-pixel units. Each of the first sub-pixel units includes one of the first sub-pixels and one of the second sub-pixels, and the first sub-pixel and the second sub-pixel are sequentially arranged from top to bottom in a column direction. The second sub-pixel units and the first sub-pixel units are arranged in arrays. Each of the second sub-pixel units includes one of the first sub-pixels and one of the second sub-pixels, and the first sub-pixel and the second sub-pixel are sequentially arranged from bottom to top in the column direction. In any one of the first area and the second area, several first sub-pixel units and several second sub-pixel units are arranged in a row direction.

Based on the above, the pixel arrangement in the LCD panel is adjusted, such that the disabled sub-pixels are scattered when the LCD panel is in the narrow viewing angle display mode, as described in the embodiments of the invention. Thereby, when the LCD panel enters the narrow viewing angle display mode, there is no dark zone or bright zone that occupies a significant area, which is conducive to improvement of the display quality when users are at the normal viewing angle.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 2:
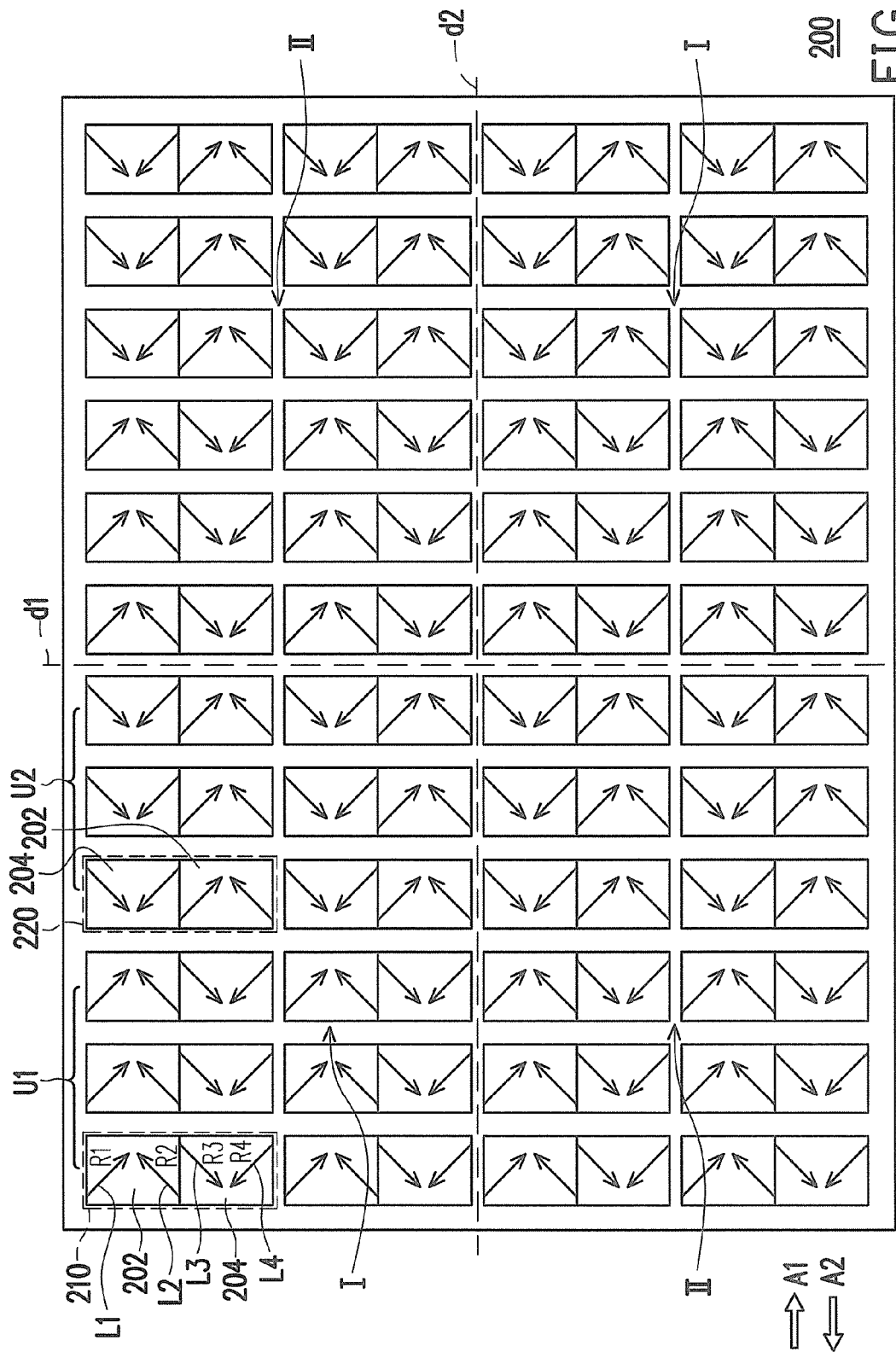
FIG. 2 is a schematic view illustrating an LCD panel according to a first embodiment of the invention.

FIG. 2 is a schematic view illustrating an LCD panel according to a first embodiment of the invention. With reference to FIG. 2, the LCD panel 200 is divided into at least one first area I and at least one second area II by dotted lines d1 and d2, for instance. Two first areas I and two second areas II are illustrated in FIG. 2 for explaining the invention, while the number of the first areas I and the number of the second areas II should not be construed as limitations to the invention. The first and second areas I and II are alternately arranged. Namely, each of the first areas I adjoins one of the second areas II, and each of the second areas II adjoins one of the first areas I.

Both the first areas I and the second areas II include a plurality of first sub-pixels 202 and a plurality of second sub-pixels 204. Each of the first sub-pixels 202 provides a first main alignment vector A1, and each of the second sub-pixels 204 provides a second main alignment vector A2. In this embodiment, a direction of the first main alignment vector A1 is opposite to a direction of the second main alignment vector A2, which should not be construed as a limitation to the invention. It should be mentioned that the first main alignment vector A1 is obtained by quantifying the capacity of the first sub-pixels 202 for aligning liquid crystal in the liquid crystal layer, while the second main alignment vector A2 is obtained by quantifying the capacity of the second sub-pixels 204 for aligning liquid crystal in the liquid crystal layer.

To be more specific, each of the first sub-pixels 202 has a first alignment area R1 and a second alignment area R2, for instance. A first alignment vector L1 of the first alignment area R1 is not parallel to a second alignment vector L2 of the second alignment area R2, and the sum vector of the first and second alignment vectors L1 and L2 is the first main alignment vector A1. In other words, each of the first sub-pixels 202 is divided into at least two alignment areas. Similarly, each of the second sub-pixels 204 can have two alignment areas, i.e., the third alignment area R3 and the fourth alignment area R4. A third alignment vector L3 of the third alignment area R3 is not parallel to a fourth alignment vector L4 of the fourth alignment area R4, and the sum vector of the third and fourth alignment vectors L3 and L4 is the second main alignment vector A2.

Figure 3:
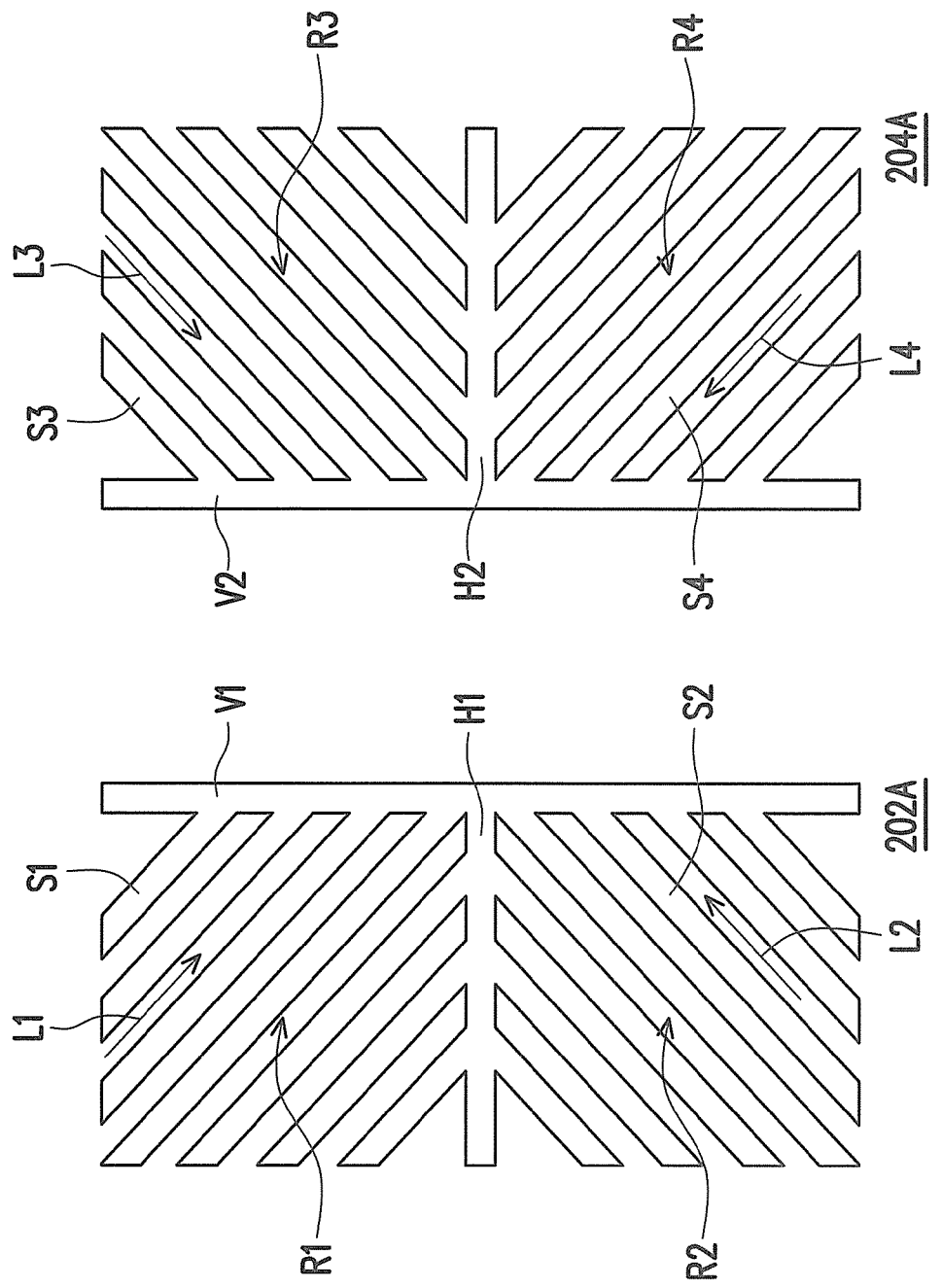
FIG. 3 is a schematic view illustrating the layout of pixel electrodes in first and second sub-pixels.

In this embodiment, the above-mentioned alignment vector distribution can be achieved by the pattern design of pixel electrodes. FIG. 3 is a schematic view illustrating pixel electrodes in first and second sub-pixels. With reference to FIG. 2 and FIG. 3, the first sub-pixels 202 have the pixel electrodes 202A, for instance, and the second sub-pixels 204 have the pixel electrodes 204A, for instance. Each of the pixel electrodes 202A includes a vertical portion V1, a horizontal portion H1, a plurality of first slant portions S1, and a plurality of second slant portions S2. The vertical portion V1 is located at one side of the pixel electrode 202A, and the pixel electrode 202A can be divided into the first alignment area R1 and the second alignment area R2 by the horizontal portion H1. Here, the first and second alignment areas R1 and R2 are equivalent. The first slant portions S1 are located in the first alignment area R1, and the second slant portions S2 are located in the second alignment area R2. Extension directions of the first slant portions S1 are not parallel to extension directions of the second slant portions S2. It should be mentioned that the capacity of the first slant portions S1 in the first alignment area R1 for aligning the liquid crystal in the liquid crystal layer can be quantified to obtain the first alignment vector L1, for instance, and the capacity of the second slant portions S2 in the second alignment area R2 for aligning the liquid crystal in the liquid crystal layer can be quantified to obtain the second alignment vector L2, for instance. Namely, according to this embodiment, the required alignment vectors can be determined based on the pattern design of the pixel electrodes 202A and the measure of the first and second alignment areas R1 and R2.

Similarly, each of the pixel electrodes 204A includes a vertical portion V2, a horizontal portion H2, a plurality of third slant portions S3, and a plurality of fourth slant portions S4. The vertical portion V2 is located at one side of the pixel electrode 204A, and the pixel electrode 204A can be divided into the third alignment area R3 and the fourth alignment area R4 by the horizontal portion H2. Here, the third and fourth alignment areas R3 and R4 are equivalent. The third slant portions S3 are located in the third alignment area R3, and the fourth slant portions S4 are located in the fourth alignment area R4. Extension directions of the third slant portions S3 are not parallel to extension directions of the fourth slant portions S4, and the capacity of the third slant portions S3 and the capacity of the fourth slant portions S4 for aligning liquid crystal in the liquid crystal layer are respectively quantified to obtain the third alignment vector L3 and the fourth alignment vector L4. Based on the pattern design of the pixel electrodes 202A and 204A, the first sub-pixels 202 and the second sub-pixels 204 can have certain capacities for aligning the liquid crystal in the liquid crystal layer. Hence, each of the first sub-pixels 202 provides the first main alignment vector A1, and each of the second sub-pixels 204 provides the second main alignment vector A2.

Besides, the embodiment shown in FIG. 3 is merely exemplary and should not be construed as a limitation to the invention. In other embodiments, the capacity of the first sub-pixels 202 and the capacity of the second sub-pixels 204 for aligning the liquid crystal in the liquid crystal layer can be achieved by the alignment protrusions or the pixel electrodes having other patterns. For instance, in other embodiments of the invention, the vertical portion V2 and the horizontal portion H2 in each pixel electrode 202A can be connected in a cross shape, so as to divide the pixel electrode 202A into four alignment areas. Each of the alignment areas can have the slant portions that respectively extend toward certain alignment directions. In other words, the slant portions in the four alignment areas can extend toward four different alignment directions, respectively. At this time, as long as the two alignment areas divided by the vertical portion V2 are not equivalent, the electrode pixel 202A can provide the required first main alignment vector A1. Similarly, the pixel electrode 204A can have four alignment areas. That is to say, the number of the alignment areas in each of the pixel electrodes 202A and 204A is not limited in the invention. As long as the alignment capacity of the pixel electrodes 202A and 204A can be quantified to obtain the first main alignment vector A1, the pixel electrodes are applicable in the embodiments of the invention.

It should be mentioned that the first and second sub-pixels 202 and 204 respectively have different alignment capacities, and therefore the display brightness of the enabled first and second sub-pixels 202 and 204 is varied when different polar viewing angles and different azimuth viewing angles are given. When only the first sub-pixels 202 are enabled in the LCD panel 200, the distribution of the display brightness is different from the distribution of the display brightness when only the second sub-pixels 204 are enabled in the LCD panel. Thereby, the LCD panel 200 can achieve the privacy protecting function when the LCD panel is in a certain display mode, e.g., a narrow viewing angle display mode.

In this embodiment, when the LCD panel 200 is in the wide viewing angle display mode, all of the first and second sub-pixels 202 and 204 in the first and second areas I and II are enabled. On this condition, the LCD panel 200 at different polar viewing angles and different azimuth viewing angles can have the same display brightness. That is to say, users at any angle are able to observe clear display images.

By contrast, when the LCD panel 200 is in the narrow viewing angle display mode, the driving voltages applied to the first sub-pixels 202 in the first areas I can be higher than the driving voltages applied to the second sub-pixels 204 in the first areas I. Namely, the display brightness of the second sub-pixels 204 in the first areas I is lower than the predetermined display brightness. The driving voltages applied to the first sub-pixels 202 in the second areas II can be lower than the driving voltages applied to the second sub-pixels 204 in the second areas II. Namely, the display brightness of the first sub-pixels 204 in the second areas II is lower than the predetermined display brightness. Alternatively, when the LCD panel 200 is in the narrow viewing angle display mode, the first sub-pixels 202 in the first areas I are enabled, while the second sub-pixels 204 in the first areas I are disabled. The first sub-pixels 202 in the second areas II are disabled, and the second sub-pixels 204 in the second areas II are enabled.

Figure 1:
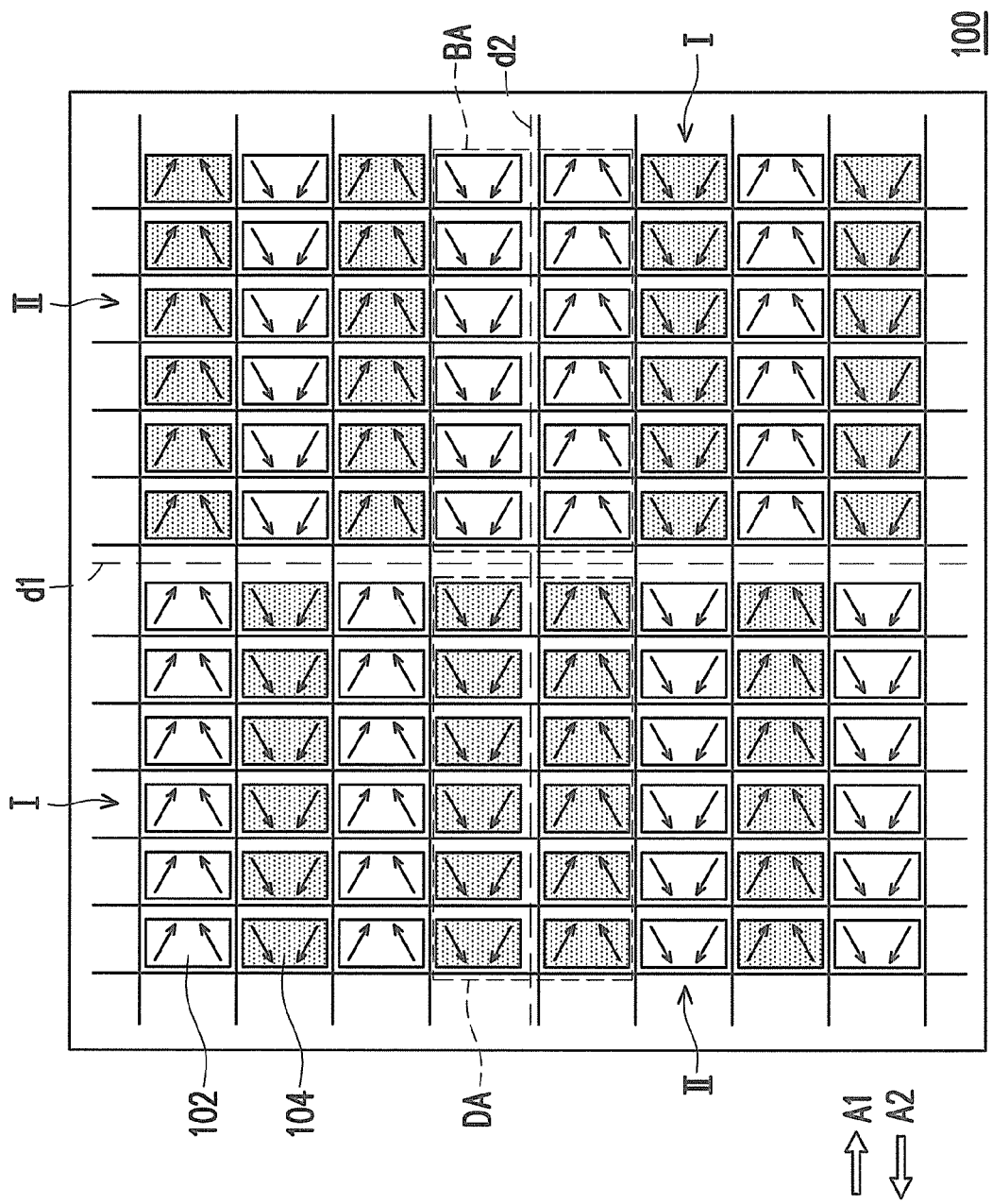
FIG. 1 is a schematic partial view illustrating a conventional LCD panel having the privacy protecting function.

At this time, the display brightness of the first areas I is mainly provided by the first sub-pixels 202, and the display brightness of the second areas II is mainly provided by the second sub-pixels 204. Since the alignment capacities of the first and second sub-pixels 202 and 204 are different, the display brightness of the first areas I is different from the display brightness of the second areas II. Particularly, when the users watch the images at a 5-degree polar viewing angle or a polar viewing angle greater than 5 degrees, the users are not able to observe clear images due to the brightness difference in the first and second areas I and II, and thereby the privacy protecting function can be accomplished. Note that the users at the normal viewing angle can observe the dark zones DA shown in FIG. 1 if the disabled sub-pixels 202 and 204 of this embodiment are concentrated at a location around the dotted lines d1 and d2, for instance. Likewise, the users at the normal viewing angle can observe the bright zones BA shown in FIG. 1 if the enabled sub-pixels 202 and 204 are concentrated. In order to the prevent the users from observing the dark and bright zones, the following layout of the sub-pixels 202 in the LCD panel 200 of this embodiment is provided below.

As indicated in FIG. 2, the LCD panel 200 can have a plurality of first sub-pixel units 210 and a plurality of second sub-pixel units 220. The second sub-pixel units 220 and the first sub-pixel units 210 are arranged in arrays. Each of the first sub-pixel units 210 includes one of the first sub-pixels 202 and one of the second sub-pixels 204, and the first sub-pixel 202 and the second sub-pixel 204 are sequentially arranged from top to bottom in a column direction. Each of the second sub-pixel units 220 includes one of the first sub-pixels 202 and one of the second sub-pixels 204, and the first sub-pixel 202 and the second sub-pixel 204 are sequentially arranged from bottom to top in the column direction. In any one of the first areas I and the second areas II, several first sub-pixel units 210 and several second sub-pixel units 220 are arranged in a same row. That is to say, each of the sub-pixels 202 and 204 in the first and second sub-pixel units 210 and 220 is arranged in different order. Besides, in the first areas I or the second areas II, several first sub-pixel units 210 and several second sub-pixel units 220 are arranged in the same row.

Specifically, each of the sub-pixel units 210 and 220 can display images having one single color. In the LCD panel 200 that can display colorful images, each pixel is required to display at least three colors, e.g., red, green, and blue. Therefore, according to this embodiment, three adjoining first sub-pixel units 210 and three adjoining second sub-pixel units 220 in the first and second areas I and II are alternately arranged in the row direction. At this time, the three adjoining first sub-pixel units 210 can respectively display red, green, and blue images and can be collectively defined as the first pixel unit U1. The three adjoining second sub-pixel units 220 can respectively display red, green, and blue images and can be collectively defined as the second pixel unit U2. The LCD panel 200 can further include a plurality of color filter patterns (not shown) arranged in a stripe distribution. At this time, the sub-pixel units 210 and 220 located at the same column display the same color. It is for sure that the invention should not be construed as limited to the embodiments described above.

Figure 4:
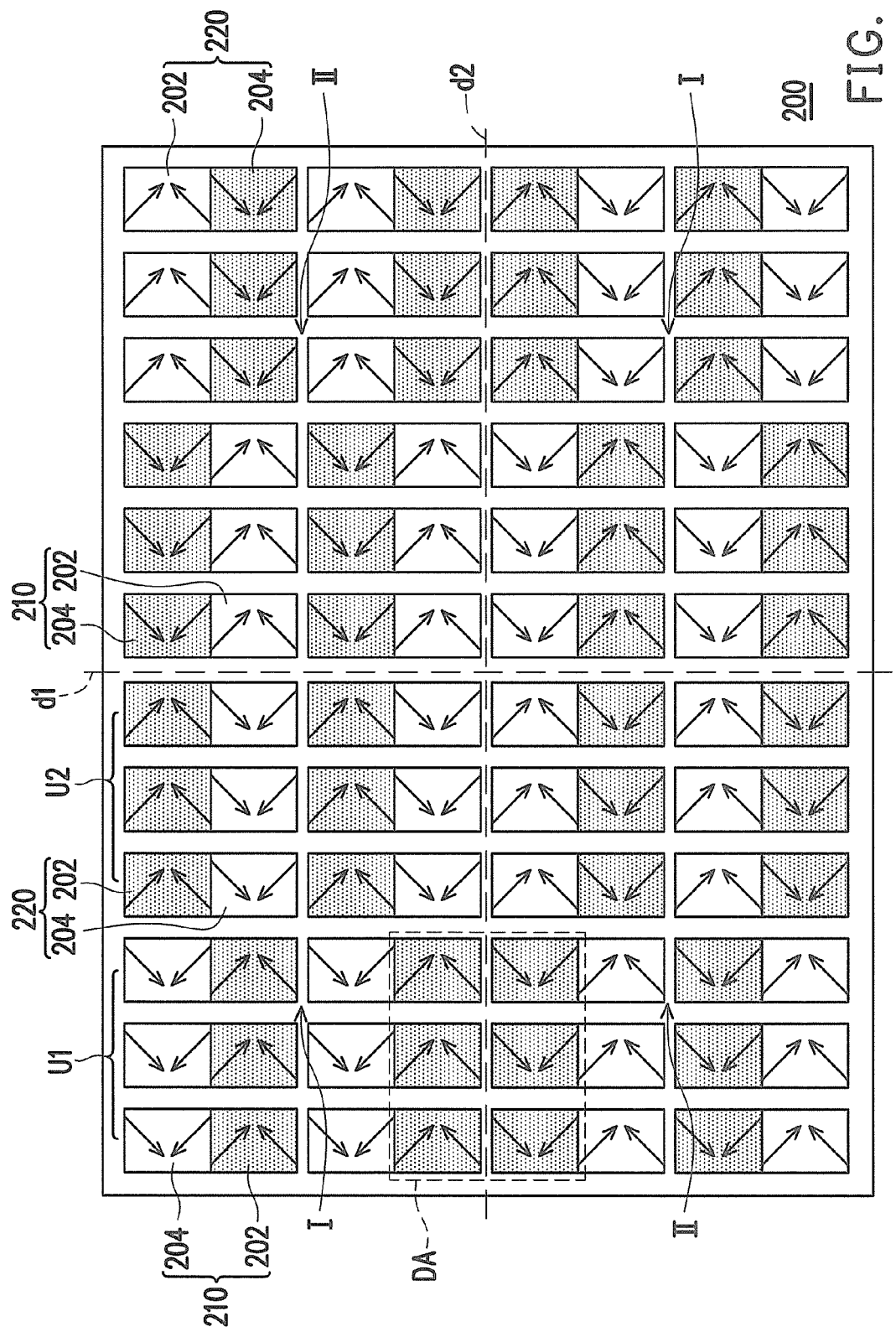
FIG. 4 is a schematic view illustrating that the LCD panel described in the first embodiment of the invention is in a narrow viewing angle display mode.

The first and second pixel units U1 and U2 in this embodiment are alternately arranged in the row direction. That is to say, the first pixel unit U1, the second pixel unit U2, the first pixel unit U1, the second pixel unit U2 . . . are arranged in the same row. FIG. 4 is a schematic view illustrating that the LCD panel described in the first embodiment of the invention is in a narrow viewing angle display mode. With reference to FIG. 4, when the LCD panel 200 is in the narrow viewing angle display mode, the second sub-pixels 204 in the first areas I are enabled, and the first sub-pixels 202 in the first areas I are disabled. The first sub-pixels 202 in the second areas II are enabled, and the second sub-pixels 204 in the second areas II are disabled. Hence, when the users at the normal viewing angle watch the images on the LCD panel 200, the brightness distribution observed by the users is shown in FIG. 4. The disabled sub-pixels 202 or 204 are not concentrated at two sides of the dotted line d2, as clearly indicated in FIG. 4. Hence, the area occupied by the dark zones DA in this embodiment is reduced in comparison with the area occupied by the dark zones DA in the related art. As such, the users at the normal viewing angle are less likely to perceive the dark zones DA, which is conducive to the improvement of the display effects when the users are at the normal viewing angle.

Figure 5:
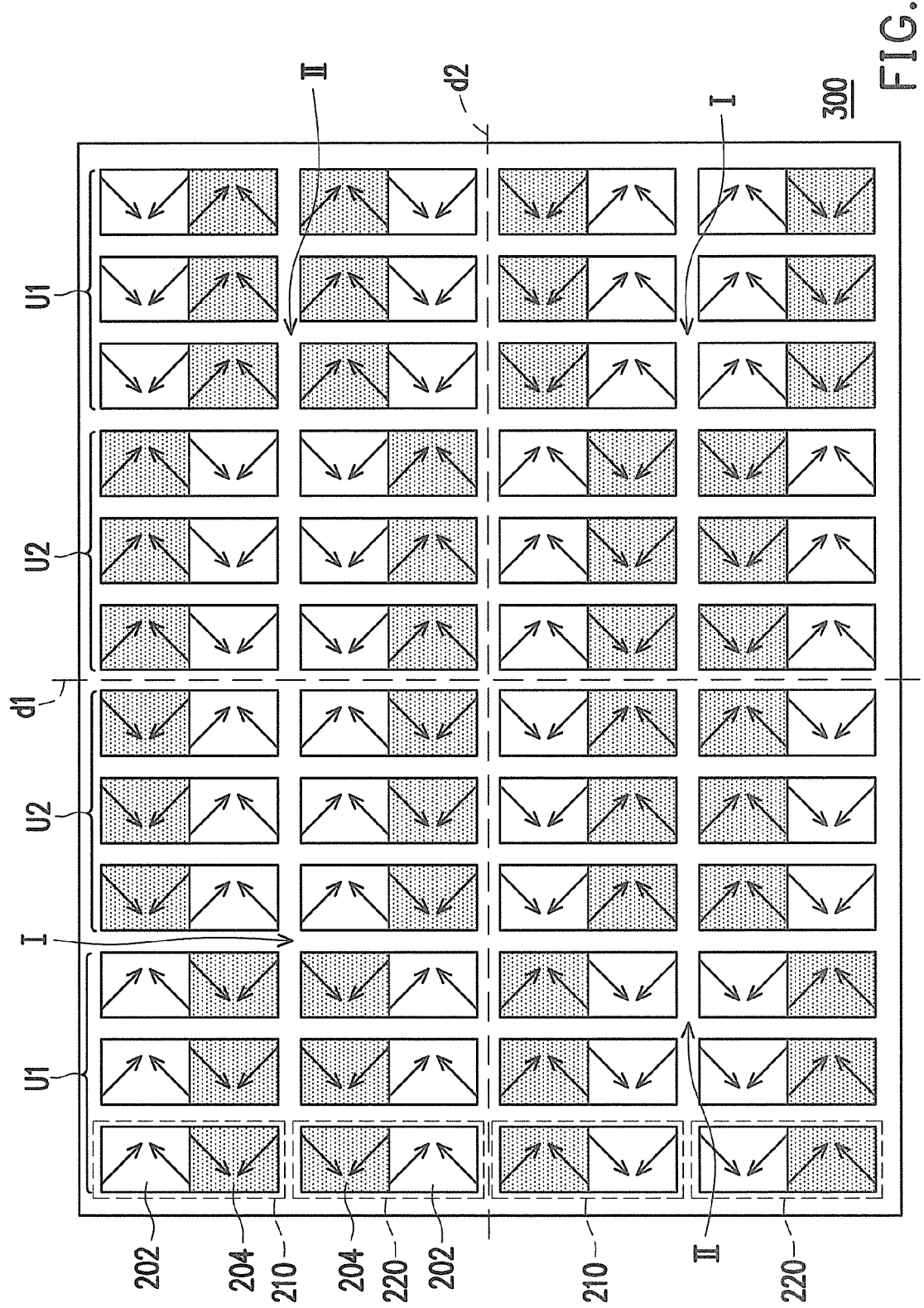
FIG. 5 is a schematic view illustrating that the LCD panel described in a second embodiment of the invention is in a narrow viewing angle display mode.

It should be mentioned that the same column merely has the first sub-pixel units 210 or the second sub-pixel units 220 according to this embodiment, which should not be construed as a limitation to the invention. FIG. 5 is a schematic view illustrating that the LCD panel described in a second embodiment of the invention is in a narrow viewing angle display mode. With reference to FIG. 5, the LCD panel 300 is substantially the same as the LCD panel 200, and therefore the reference numbers and descriptions of the components in the LCD panel 300 can be referred to as those in the first embodiment. The main difference between this embodiment and the first embodiment lies in that the first sub-pixel units 210 and the second sub-pixel units 220 in the LCD panel 300 are alternately arranged in the column direction. Namely, the first sub-pixel unit 210, the second sub-pixel unit 220, the first sub-pixel unit 210, the second sub-pixel unit 220 . . . are arranged in the same column. In the column direction, the second sub-pixel 204 in each of the first sub-pixel units 210 adjoins the second sub-pixel 204 in one of the second sub-pixel units 220, and the first sub-pixel 202 in each of the first sub-pixel units 210 adjoins the first sub-pixel 202 in one of the second sub-pixel units 220.

According to this embodiment, when the LCD panel 300 is in the narrow viewing angle display mode, the first sub-pixels 202 in the first areas I are enabled, and the second sub-pixels 204 in the first areas I are disabled. The second sub-pixels 204 in the second areas II are enabled, and the first sub-pixels 202 in the second areas II are disabled. Hence, when three adjoining first sub-pixel units 210 and three adjoining second sub-pixel units 220 are alternately arranged in the row direction, and one of the first sub-pixel units 210 and one of the second sub-pixel units 220 are alternately arranged in the column direction, the disabled first and second sub-pixels 202 and 204 are distributed in a manner shown in FIG. 5. At this time, the disabled first and second sub-pixels 202 and 204 are not concentrated at two sides of the dotted line d2, so as to reduce the area occupied by the dark zones and improve the normal viewing angle display quality of the LCD panel 300.

Figure 6:
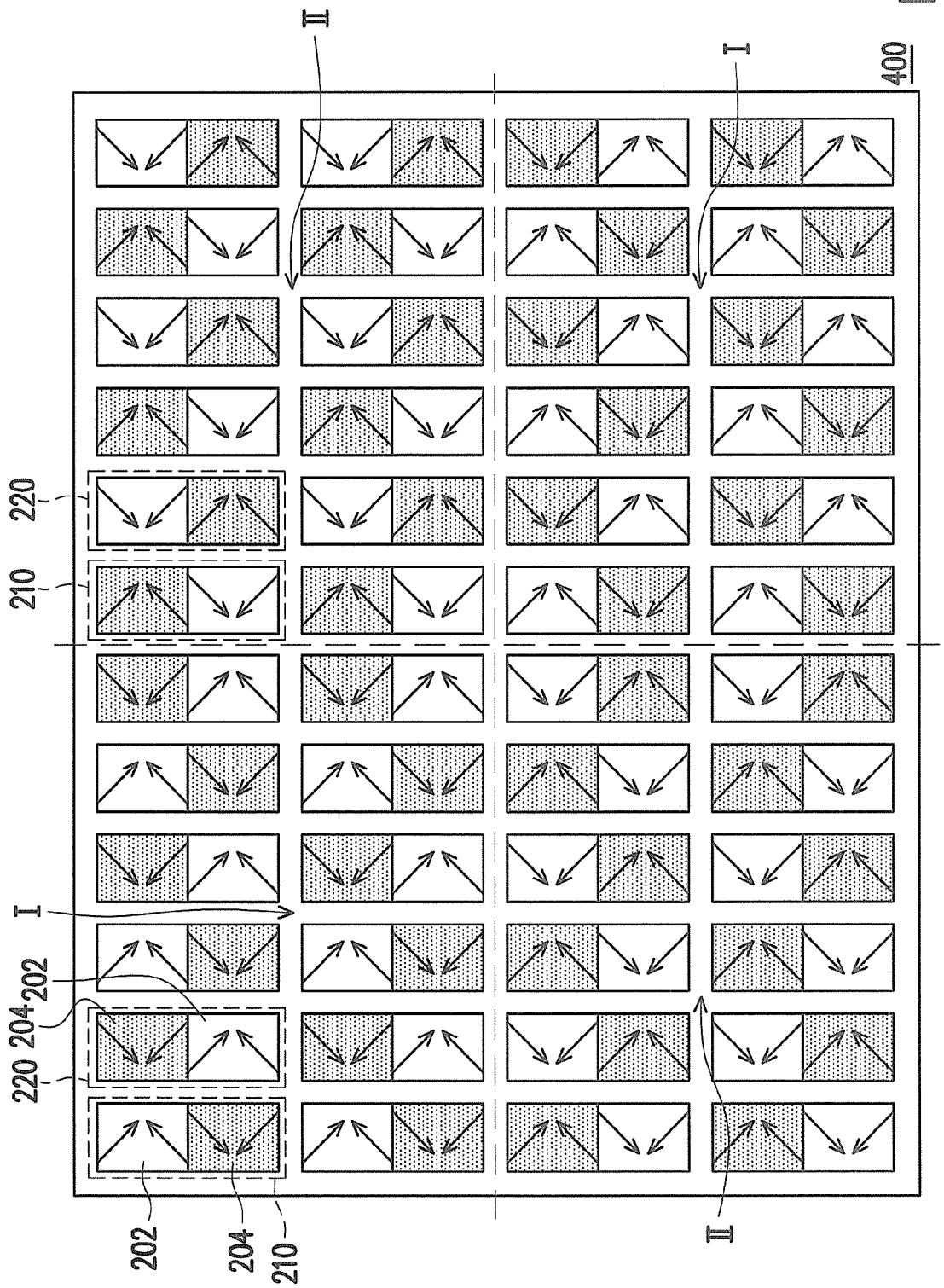
FIG. 6 is a schematic view illustrating that the LCD panel described in a third embodiment of the invention is in a narrow viewing angle display mode.

FIG. 6 is a schematic view illustrating that the LCD panel described in a third embodiment of the invention is in a narrow viewing angle display mode. With reference to FIG. 6, components of the LCD panel 400 are substantially the same as those of the LCD panel 200, and therefore the reference numbers of the same components in this embodiment and the first embodiment are identical. The main difference between this embodiment and the first embodiment lies in that one of the first sub-pixel units 210 and one of the second sub-pixel units 220 in the LCD panel 400 are alternately arranged in the row direction. Namely, the first sub-pixel unit 210, the second sub-pixel unit 220, the first sub-pixel unit 210, the second sub-pixel unit 220 . . . are arranged in the same row.

In this embodiment, when the LCD panel 400 is in the narrow viewing angle display mode, the first sub-pixels 202 in the first areas I are enabled, and the second sub-pixels 204 in the first areas I are disabled. The second sub-pixels 204 in the second areas II are enabled, and the first sub-pixels 202 in the second areas II are disabled. Under said configuration, the brightness distribution of the first and second areas I and II is shown in FIG. 6, and the disabled first and second sub-pixels 202 and 204 are not concentrated. Accordingly, when the LCD panel 400 is in the narrow viewing angle display mode, the LCD panel 400 can still have favorable normal viewing angle display quality.

Figure 7:
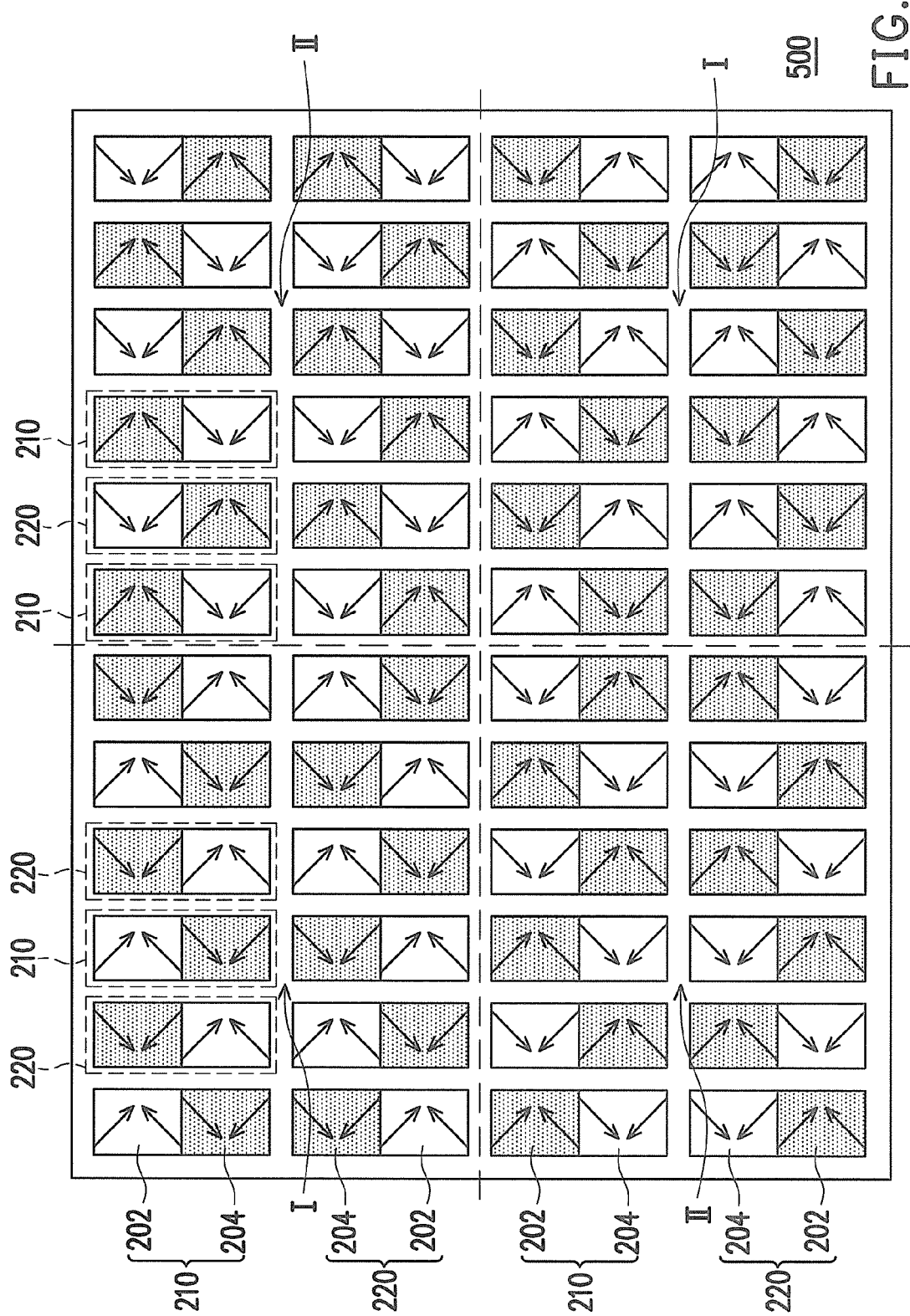
FIG. 7 is a schematic view illustrating that the LCD panel described in a fourth embodiment of the invention is in a narrow viewing angle display mode.

FIG. 7 is a schematic view illustrating that the LCD panel described in a fourth embodiment of the invention is in a narrow viewing angle display mode. With reference to FIG. 7, the LCD panel 500 is substantially the same as the LCD panel 400, and therefore the reference numbers of the same components in the third and fourth embodiments are identical. The main difference between this embodiment and the third embodiment lies in that the first sub-pixel units 210 and the second sub-pixel units 220 in the LCD panel 500 are alternately arranged in the column direction. Namely, the first sub-pixel unit 210, the second sub-pixel unit 220, the first sub-pixel unit 210, the second sub-pixel unit 220 . . . are arranged in the same column. In the column direction, the second sub-pixel 204 in each of the first sub-pixel units 210 adjoins the second sub-pixel 204 in one of the second sub-pixel units 220, and the first sub-pixel 202 in each of the first sub-pixel units 210 adjoins the first sub-pixel 202 in one of the second sub-pixel units 220.

In this embodiment, when the LCD panel 500 is in the narrow viewing angle display mode, the first sub-pixels 202 in the first areas I are enabled, and the second sub-pixels 204 in the first areas I are disabled. The second sub-pixels 204 in the second areas II are enabled, and the first sub-pixels 202 in the second areas II are disabled. Since the disabled first and second sub-pixels 202 and 204 are not concentrated under said configuration, the dark zones do not occupy a significant area. Accordingly, when the LCD panel 500 is in the narrow viewing angle display mode, the LCD panel 500 can still have favorable normal viewing angle display quality.

Figure 8:
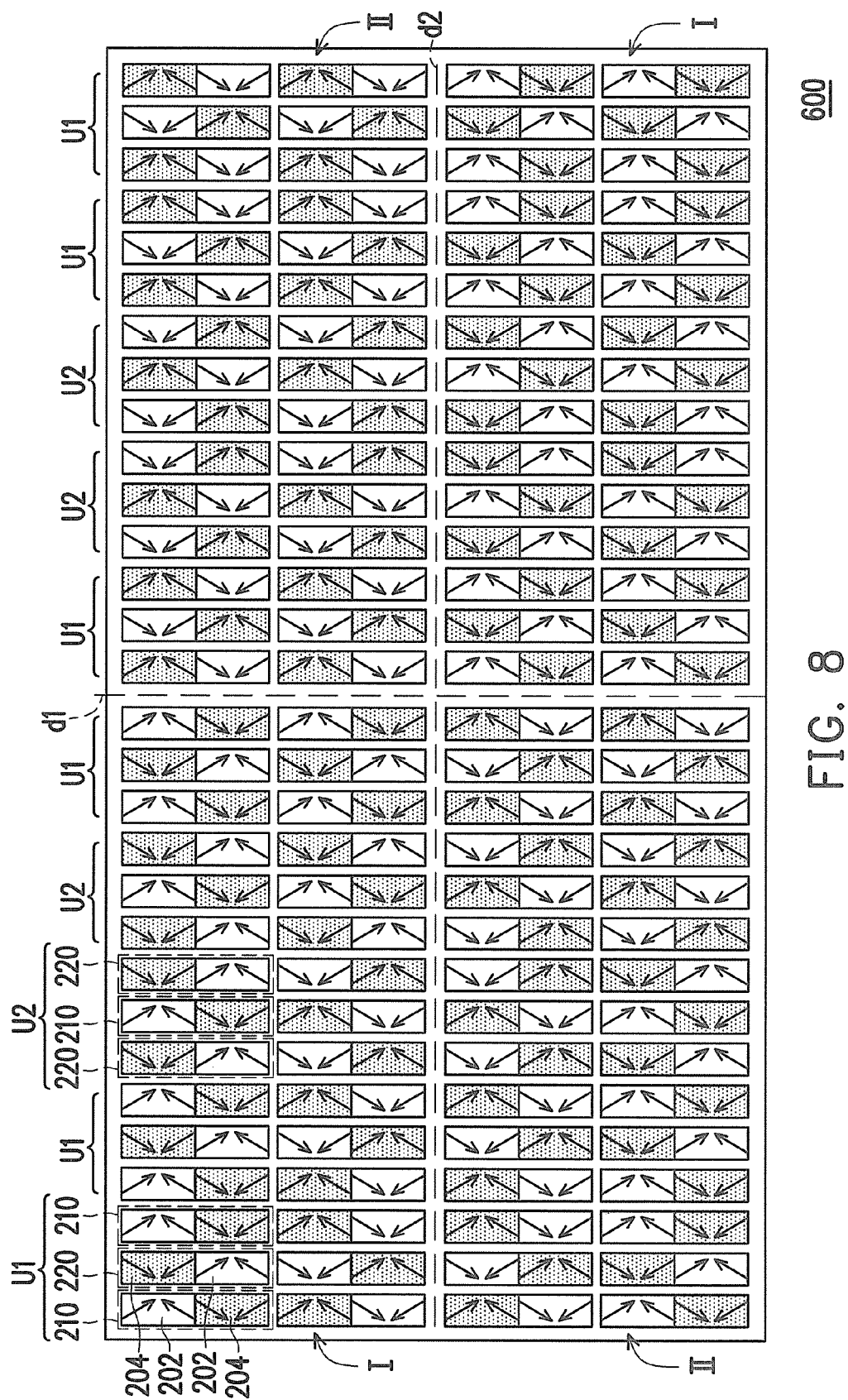
FIG. 8 is a schematic view illustrating that the LCD panel described in a fifth embodiment of the invention is in a narrow viewing angle display mode.

FIG. 8 is a schematic view illustrating that the LCD panel described in a fifth embodiment of the invention is in a narrow viewing angle display mode. With reference to FIG. 8, components of the LCD panel 600 are substantially the same as those of the LCD panel 200, and therefore the reference numbers of the same components in this embodiment and in the first embodiment are identical. That is to say, the LCD panel 600 can be divided into at least one first area I and at least one second area II by the dotted lines d1 and d2, and the first and second areas I and II both include a plurality of first sub-pixels 202 and a plurality of second sub-pixels 204. The main difference between this embodiment and the first embodiment lies in the arrangement of the components. According to this embodiment, the first and second sub-pixel units 210 and 220 define a plurality of first and second pixel units U1 and U2.

Each of the first pixel units U1 includes two first sub-pixel units 210 and one second sub-pixel unit 220, and each of the second pixel units U2 includes one first sub-pixel unit 210 and two second sub-pixel units 220. In this embodiment, the second sub-pixel unit 220 in each of the first pixel units U1 is sandwiched by two first sub-pixel units 210, and the first sub-pixel unit 210 in each of the second pixel units U2 is sandwiched by two second sub-pixel units 220. Besides, in the first and second areas I and II, two adjoining first pixel units U1 and two adjoining second pixel units U2 are alternately arranged in the row direction. Namely, the first pixel unit U1, the first pixel unit U1, the second pixel unit U2, the second pixel unit U2, the first pixel unit U1, the first pixel unit U1, the second pixel unit U2, the second pixel unit U2 . . . are arranged in the same row.

The first and second pixel units U1 and U2 are symmetrically arranged in the row direction with respect to a junction of the first and second areas I and II as a baseline (i.e., the dotted line d1). Particularly, the junction of the first and second areas I and II, as shown by the dotted line d1, refers to the junction of two adjoining first pixel units U1 or the junction of two adjoining second pixel units U2. In this embodiment, when the LCD panel 600 is in the narrow viewing angle display mode, the first sub-pixels 202 in the first areas I are enabled, and the second sub-pixels 204 in the first areas I are disabled. The second sub-pixels 204 in the second areas II are enabled, and the first sub-pixels 202 in the second areas II are disabled. Since the disabled first and second sub-pixels 202 and 204 are scattered under said configuration, the dark zones do not occupy a significant area. Accordingly, when the LCD panel 600 is in the narrow viewing angle display mode, the LCD panel 600 can still have favorable normal viewing angle display quality.

Figure 9:
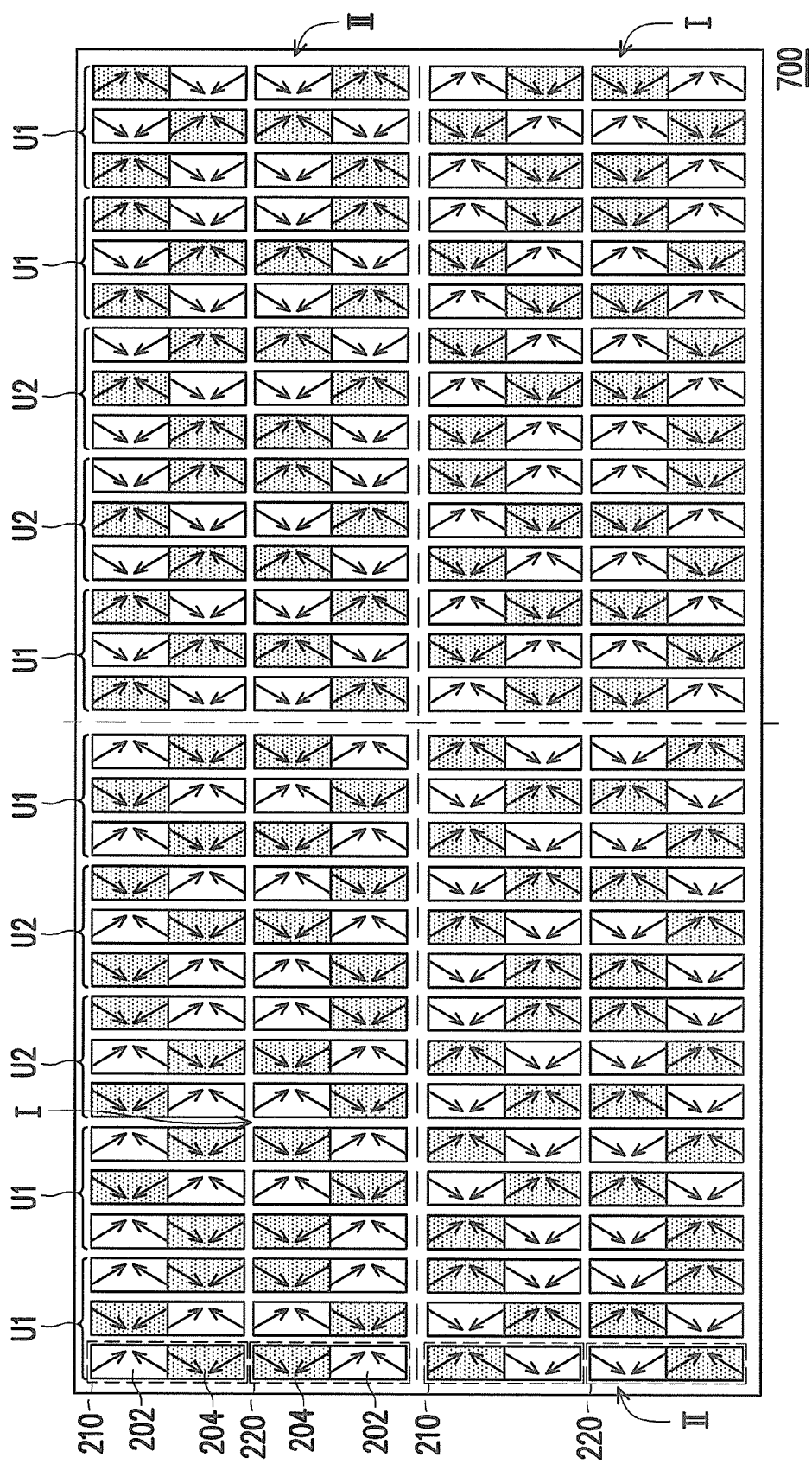
FIG. 9 is a schematic view illustrating that the LCD panel described in a sixth embodiment of the invention is in a narrow viewing angle display mode.

FIG. 9 is a schematic view illustrating that the LCD panel described in a sixth embodiment of the invention is in a narrow viewing angle display mode. With reference to FIG. 9, the LCD panel 700 is substantially the same as the LCD panel 600, and therefore the reference numbers of the same components in this embodiment and in the fifth embodiment are identical. The main difference between this embodiment and the fifth embodiment lies in that the first sub-pixel units 210 and the second sub-pixel units 220 in the LCD panel 700 are alternately arranged in the column direction. Namely, the first sub-pixel unit 210, the second sub-pixel unit 220, the first sub-pixel unit 210, the second sub-pixel unit 220 . . . are arranged in the same column. In the column direction, the second sub-pixel 204 in each of the first sub-pixel units 210 adjoins the second sub-pixel 204 in one of the second sub-pixel units 220, and the first sub-pixel 202 in each of the first sub-pixel units 210 adjoins the first sub-pixel 202 in one of the second sub-pixel units 220.

In light of the foregoing, when the LCD panel described in the embodiments of the invention is in the narrow viewing angle display mode, some sub-pixels are lighted, while the other sub-pixels are not lighted or display insufficient brightness. Besides, the sub-pixels lighted in different areas have different alignment vectors. Therefore, when the images displayed on the LCD are observed at the large polar viewing angle, the display images do not have uniform brightness, and thus the entire images cannot be easily observed. Thereby, the privacy protecting function can be accomplished. Moreover, according to the embodiments of the invention, the sub-pixels that are not lighted or display insufficient brightness are scattered when the LCD is in the narrow viewing angle display mode. According to the related art, the sub-pixels that are not lighted or display insufficient brightness are concentrated. By contrast, dark zones or bright zones are less likely to be observed at the normal view direction when the LCD panel described in the embodiments of the invention is in the narrow viewing angle display mode. As a result, when the LCD panel described in the embodiments of the invention is in the narrow viewing angle display mode, the LCD panel can still have favorable normal viewing angle display quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A liquid crystal display panel divided into at least one first area and at least one second area, the at least one first area and the at least one second area both comprising a plurality of sub-pixels divided into a plurality of first sub-pixels and a plurality of second sub-pixels, each of the first sub-pixels providing a first main alignment vector, each of the second sub-pixels providing a second main alignment vector, a direction of the first main alignment vector being opposite to a direction of the second main alignment vector, wherein when the liquid crystal display panel is in a narrow viewing angle display mode, a driving voltage applied to the first sub-pixels in the at least one first area is higher than a driving voltage applied to the second sub-pixels in the at least one first area, and a driving voltage applied to the first sub-pixels in the at least one second area is lower than a driving voltage applied to the second sub-pixels in the at least one second area, the liquid crystal display panel having:
a plurality of first sub-pixel units, each of the first sub-pixel units comprising one of the first sub-pixels and one of the second sub-pixels below the one of the first sub-pixels in a column direction; and
a plurality of second sub-pixel units, the second sub-pixel units and the first sub-pixel units being arranged in arrays, each of the second sub-pixel units comprising one of the first sub-pixels and one of the second sub-pixels on top of the one of the first sub-pixels in the column direction, wherein several first sub-pixel units of the first sub-pixel units and several second sub-pixel units of the second sub-pixel units area are arranged together in a same row in any of the at least one first area and the at least one second area,
wherein the first area and the second area arranged adjacent to each other in the column direction has a first baseline therebetween, each two adjoining sub-pixels located at two opposite sides of the first baseline form a sub-pixel pair, the two sub-pixels of each sub-pixel pair are applied with the same driving voltage, and all of the sub-pixels located at one side of and adjacent to the first baseline in the first area or the second area are not completely applied with the same driving voltage.

2. The liquid crystal display panel as recited in claim 1, wherein three adjoining first sub-pixel units of the first sub-pixel units and three adjoining second sub-pixel units of the second sub-pixel units are alternately arranged in the row direction in the at least one first area and the at least one second area.

3. The liquid crystal display panel as recited in claim 2, wherein one of the first sub-pixel units and one of the second sub-pixel units are alternately arranged in the column direction in the at least one first area and the at least one second area.

4. The liquid crystal display panel as recited in claim 1, wherein one of the first sub-pixel units and one of the second sub-pixel units are alternately arranged in the row direction in the at least one first area and the at least one second area.

5. The liquid crystal display panel as recited in claim 4, wherein one of the first sub-pixel units and one of the second sub-pixel units are alternately arranged in the column direction in the at least one first area and the at least one second area.

6. The liquid crystal display panel as recited in claim 1, wherein each of the first sub-pixel units and each of the second sub-pixel units are alternately arranged in the column direction, the second sub-pixel in the each of the first sub-pixel units adjoins the second sub-pixel in one of the second sub-pixel units, and the first sub-pixels in the each of the first sub-pixel units adjoins the first sub-pixel in one of the second sub-pixel units.

7. The liquid crystal display panel as recited in claim 6, wherein one of the first sub-pixel units and one of the second sub-pixel units are alternately arranged in the column direction in the at least one first area and the at least one second area.

8. The liquid crystal display panel as recited in claim 1, wherein the first sub-pixel units and the second sub-pixel units define a plurality of first pixel units and a plurality of second pixel units, the first sub-pixel units and the second sub-pixel units are symmetrically arranged in the row direction with respect to a junction of the at least one first area and the at least one second area as a second baseline, each of the first pixel units comprises two of the first sub-pixel units and one of the second sub-pixel units, the one of the second sub-pixel units in the each of the first pixel units is sandwiched by the corresponding two first sub-pixel units, each of the second pixel units comprises one of the first sub-pixel units and two of the second sub-pixel units, and the one of the first sub-pixel units in the each of the second pixel units is sandwiched by the corresponding two second sub-pixel units.

9. The liquid crystal display panel as recited in claim 8, wherein two adjoining first pixel units of the first pixel units and two adjoining second pixel units of the second pixel units are alternately arranged in the row direction in the at least one first area and the at least one second area.

10. The liquid crystal display panel as recited in claim 9, wherein the junction of the at least one first area and the at least one second area is a junction of the two adjoining first pixel units of the first pixel units or a junction of the two adjoining second pixel units of the second pixel units.

11. The liquid crystal display panel as recited in claim 10, wherein one of the first sub-pixel units and one of the second sub-pixel units are alternately arranged in the column direction in the at least one first area and the at least one second area.

12. The liquid crystal display panel as recited in claim 9, wherein one of the first sub-pixel units and one of the second sub-pixel units are alternately arranged in the column direction in the at least one first area and the at least one second area.

13. The liquid crystal display panel as recited in claim 8, wherein one of the first sub-pixel units and one of the second sub-pixel units are alternately arranged in the column direction in the at least one first area and the at least one second area.

14. The liquid crystal display panel as recited in claim 1, wherein one of the first sub-pixel units and one of the second sub-pixel units are alternately arranged in the column direction in the at least one first area and the at least one second area.

15. The liquid crystal display panel as recited in claim 1, wherein the first sub-pixels and the second sub-pixels in the same column display same color in the at least one first area and the at least one second area.

16. The liquid crystal display panel as recited in claim 1, further comprising a plurality of color filter patterns arranged in a striped distribution.

17. The liquid crystal display panel as recited in claim 1, wherein each of the first sub-pixels has a first alignment area and a second alignment area, a first alignment vector of the first alignment area is not parallel to a second alignment vector of the second alignment area, and a sum vector of the first and second alignment vectors is the first main alignment vector.

18. The liquid crystal display panel as recited in claim 1, wherein each of the second sub-pixels has a third alignment area and a fourth alignment area, a third alignment vector of the third alignment area is not parallel to a fourth alignment vector of the fourth alignment area, and a sum vector of the third and fourth alignment vectors is the second main alignment vector.

19. The liquid crystal display panel as recited in claim 1, wherein when the liquid crystal display panel is in a wide viewing angle display mode, all of the first sub-pixels and the second sub-pixels in the at least one first area and the at least one second area are enabled.

20. The liquid crystal display panel as recited in claim 1, wherein any two adjoining sub-pixel pairs of the sub-pixel pairs are applied with different driving voltages.

21. The liquid crystal display panel as recited in claim 1, wherein every three or a multiple of three adjoining sub-pixel pairs of the sub-pixel pairs are applied with the same driving voltage.

22. The liquid crystal display panel as recited in claim 1, wherein the first sub-pixel units and the second sub-pixel units define a plurality of first pixel units and a plurality of second pixel units, one of the first pixel units and one of the second pixel units are alternately arranged in the row direction, each of the first pixel units comprises two of the first sub-pixel units and one of the second sub-pixel units, the one of the second sub-pixel units in the each of the first pixel units is sandwiched by the corresponding two first sub-pixel units, each of the second pixel units comprises one of the first sub-pixel units and two of the second sub-pixel units, and the one of the first sub-pixel units in the each of the second pixel units is sandwiched by the corresponding two second sub-pixel units.

23. A liquid crystal display panel divided into at least one first area and at least one second area, the at least one first area and the at least one second area both comprising a plurality of sub-pixels divided into a plurality of first sub-pixels and a plurality of second sub-pixels, each of the first sub-pixels providing a first main alignment vector, each of the second sub-pixels providing a second main alignment vector, a direction of the first main alignment vector being opposite to a direction of the second main alignment vector, wherein when the liquid crystal display panel is in a narrow viewing angle display mode, a driving voltage applied to the first sub-pixels in the at least one first area is higher than a driving voltage applied to the second sub-pixels in the at least one first area, and a driving voltage applied to the first sub-pixels in the at least one second area is lower than a driving voltage applied to the second sub-pixels in the at least one second area, the liquid crystal display panel having:
  a plurality of first sub-pixel units, each of the first sub-pixel units comprising one of the first sub-pixels and one of the second sub-pixels below the one of the first sub-pixels in a column direction; and
  a plurality of second sub-pixel units, the second sub-pixel units and the first sub-pixel units being arranged in arrays, each of the second sub-pixel units comprising one of the first sub-pixels and one of the second sub-pixels on top of the one of the first sub-pixels in the column direction, wherein several first sub-pixel units of the first sub-pixel units and several second sub-pixel units of the second sub-pixel units area are arranged together in a same row in any of the at least one first area and the at least one second area,
  wherein the first area and the second area arranged adjacent to each other in the column direction has a first baseline therebetween, each two adjoining sub-pixels located at two opposite sides of the first baseline form a sub-pixel pair, the two sub-pixels of each sub-pixel pair are applied with different driving voltages, and all of the sub-pixels located at one side of and adjacent to the first baseline in the first area or the second area are not completely applied with the same driving voltage.

24. The liquid crystal display panel as recited in claim 23, wherein three adjoining first sub-pixel units of the first sub-pixel units and three adjoining second sub-pixel units of the second sub-pixel units are alternately arranged in the row direction in the at least one first area and the at least one second area.

25. The liquid crystal display panel as recited in claim 23, wherein three sub-pixels of three adjoining sub-pixel pairs located at one side of the first baseline are applied with the same voltage.

26. The liquid crystal display panel as recited in claim 23, wherein one of the first sub-pixel units and one of the second sub-pixel units are alternately arranged in the row direction in the at least one first area and the at least one second area.

27. The liquid crystal display panel as recited in claim 23, wherein the first sub-pixel units and the second sub-pixel units define a plurality of first pixel units and a plurality of second pixel units, one of the first pixel units and one of the second pixel units are alternately arranged in the row direction, each of the first pixel units comprises two of the first sub-pixel units and one of the second sub-pixel units, the one of the second sub-pixel units in the each of the first pixel units is sandwiched by the corresponding two first sub-pixel units, each of the second pixel units comprises one of the first sub-pixel units and two of the second sub-pixel units, and the one of the first sub-pixel units in the each of the second pixel units is sandwiched by the corresponding two second sub-pixel units.

28. The liquid crystal display panel as recited in claim 23, wherein the first sub-pixel units and the second sub-pixel units define a plurality of first pixel units and a plurality of second pixel units, the first sub-pixel units and the second sub-pixel units are symmetrically arranged in the row direction with respect to a junction of the at least one first area and the at least one second area as a second baseline, each of the first pixel units comprises two of the first sub-pixel units and one of the second sub-pixel units, the one of the second sub-pixel units in the each of the first pixel units is sandwiched by the corresponding two first sub-pixel units, each of the second pixel units comprises one of the first sub-pixel units and two of the second sub-pixel units, and the one of the first sub-pixel units in the each of the second pixel units is sandwiched by the corresponding two second sub-pixel units.

* * * * *